139
W. WILSON.
Corder for Sewing-Machines.
No. 6,603. Reissued Aug. 17, 1875.
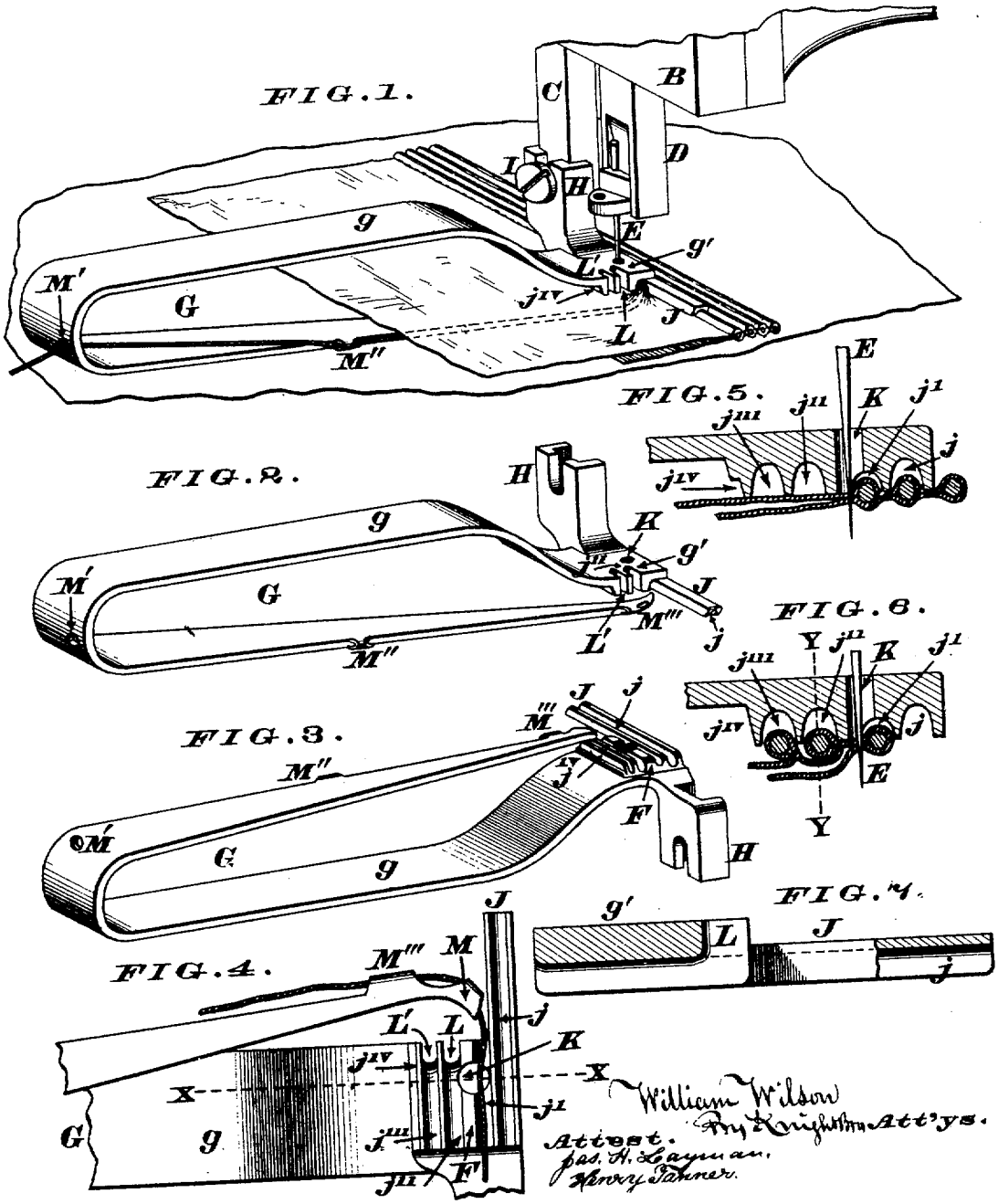
William Wilson
By Knight Bros. Att'ys.
Attest.
Jas. H. Layman.
Henry Tanner.
N. PETERS, PHOTO-LITHOGRAPHER, WASHINGTON, D. C.

UNITED STATES PATENT OFFICE.

BEST AVAILABLE COPY

WILLIAM WILSON, OF CINCINNATI, OHIO.

IMPROVEMENT IN CORDERS FOR SEWING-MACHINES.

Specification forming part of Letters Patent No. 146,736, dated January 20, 1874; reissue No. 6,603, dated August 17, 1875; application filed February 13, 1875.

*To all whom it may concern:*

Be it known that I, WILLIAM WILSON, of Cincinnati, Hamilton county, Ohio, have invented a new and useful Corder for Sewing-Machines, of which the following is a specification:

This attachment is designed to enable a comparatively unskilled operator to cord either a single or double fabric with absolute accuracy, the material being automatically guided to its work.

Figure 1 is a perspective view of my corder attached to a machine, and in the act of cording between two pieces of goods. Fig. 2 is a perspective view of the corder detached. Fig. 3 is a perspective view of the same inverted. Fig. 4 is an enlarged plan of the operative portion of corder inverted. Fig. 5 is a section showing the method of cording between two pieces of cloth. Fig. 6 is a similar section, representing the mode of cording a single thickness of cloth. Fig. 7 is a section on the line Y Y of Fig. 6, the cloth being removed from the corder.

Of the above illustrations, Figs. 4, 5, 6, and 7 are drawn on an enlarged scale.

I have selected for the present illustration a corder in which each successive cording is applied to the left of those previously laid when cording between two plies or pieces of goods, and to the right when cording a single piece or thickness, all the figures illustrating such dispositions of the cordings.

A, B, C, D, and E may represent, respectively, the cloth-plate, guide-head, presser-bar, needle-bar, and needle of a sewing-machine. F is an elastic U-shaped blade or "goose-neck," preferably of spring brass or steel, whose upper limb, *g*, terminates in a depressed horizontal portion, *g'*, which takes the place of, and discharges the functions of, the presser-foot, as well as those hereinafter recited. The said limb has a suitable lug, H, and screw I, by which it is attached to the bar C, in place of the presser-foot. The portion *g'* is prolonged on its receiving side into a tongue or guide, J, that extends parallel with the feed, and whose under side is groved at *j* throughout its length, the same being one of a series of parallel grooves, of which two grooves, *j* are to the right, and the remaining grooves, *j'' j'''*, are to the left, of the needle-hole K. Of these, the groove *j'* is sufficiently shallow to press the goods closely around the cord while being stitched, the depth of the other grooves being such as to enable them to straddle, without touching the top of the already formed cording, which is thus made available to guide the goods. The right and the left series of grooves are separated by an interval, F, to hold the adjacent cordings apart in working on single goods. The grooves *j'' j'''*, immediately to left of the needle, are carried vertically upward in front to form notches L L'. From the horizontal portion *g'* the limb *g* bends upward, and thence extends horizontally to the middle of the blade, where it bends downward, and, returning under and parallel to the upper limb, gradually tapers to its far extremity, where it terminates in a curving tubular cord-guide, M''', the same being one of a series, M M'' M''', with which the blade is provided.

The operation of my improved corder is as follows: Whether for single or double cording, the cloth is first folded with the cord inside it, the left edge of the tongue J serving as a guide for the folded edge of the goods while the first line of cord is being sewed in. If it be now desired to cord between two pieces of goods, the latter are introduced, with the previously laid cording in the groove, whose edges, straddling the said cording without touching its top, hold the goods effectually to their proper course. If, on the other hand, it is desired to cord on single thickness, the previously laid cording is made to enter a groove to left of the needle, the groove *j''*, nearest the needle, being employed for the closest cording, and a more distant one, *j'''*, for wider cording. In the subsequent passes, the cordings pass, as they are formed, one by one to the left, the grooves on the left side of the needle holding the cloth so effectually to its course as to supersede the necessity of being guided by the operator.

I have described the corder as adapted to a "Singer" sewing-machine, and have shown means for its attachment to the presser-foot bar used in that machine; but it may obviously be adapted to other machines without changing the essential features of the invention. It is further manifest that it may be

BEST AVAILABLE COPY adapted for attachment to the cloth-plate of whatever machine it is designed to be used with—as for example, by means of a movable member carried under the presser-foot, and rising and falling therewith. The goose-neck may be of spring-wire, if desired.

I claim as new and of my invention—

1. A sewing-machine corder, provided with a foot having grooves on both sides of the needle-hole, for optional use in cording with single or double thicknesses, as explained.

2. In a sewing-machine corder, a presser-foot, provided with a prolongation or tongue, J, projecting toward the direction from which the goods are fed, as described.

3. In a sewing-machine corder, the presser-foot *g'*, provided with a prolongation or tongue, J, and with notched grooves *j'' j'''*, located on the opposite side of the needle-hole from said tongue J, as described.

In testimony of which invention, I hereunto set my hand.

WILLIAM WILSON.

Attest:
GEO. H. KNIGHT,
SAML. KNIGHT.